United States Patent Office 2,798,689
Patented July 9, 1957

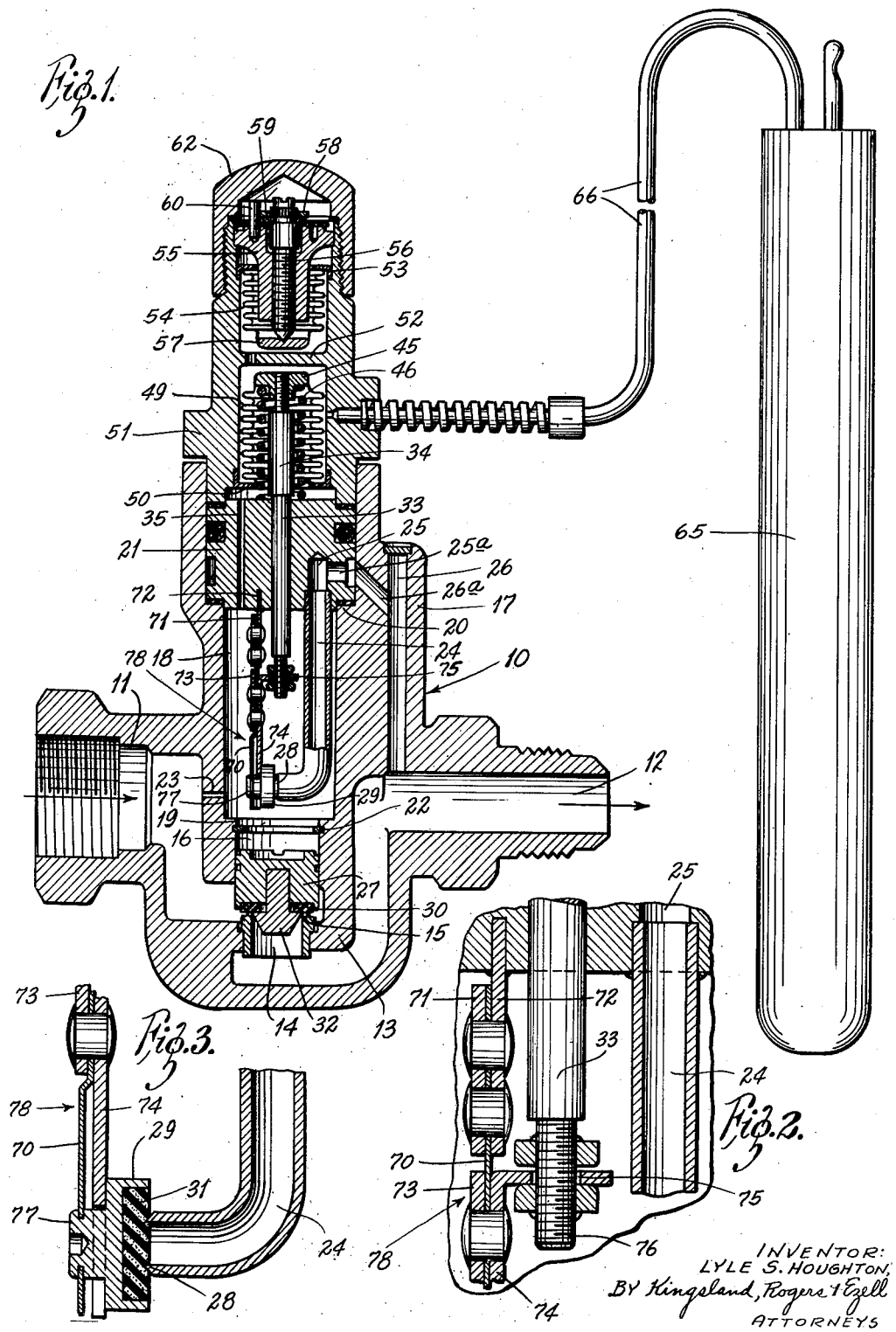

2,798,689

SNAP-ACTION VALVE

Lyle S. Houghton, Brentwood, Mo., assignor to Alco Valve Company, University City, Mo., a corporation of Missouri Application March 18, 1953, Serial No. 343,143

3 Claims. (Cl. 251—75)

The present invention relates to a snap-action suction valve and in particular is concerned with a pilot-operated piston valve in which the pilot valve is closed by a snap-action mechanism.

In the past, suction valves and other fluid pressure valves have been provided which were of the floating piston, pilot-operated type, and in these valves it has been found to be a major problem to effect a clear and instantaneous opening of the pilot valve, such that proper operation of the main floating piston valve could be had. The patent to Kounovsky and Dube, No. 2,520,216, issued August 29, 1950 to applicant's assignee, is a valve of this type and over which applicant's present invention was evolved. In the apparatus of the Kounovsky and Dube patent, the operation of the pilot valve was in direct accordance with fluctuation of temperature in a sensing element to which the valve was connected, and it was found that modulation and throttling of the pilot valve was encountered and could not be avoided. This type of operation has been improved by the instant invention to give a clear-cut operation upon changes in temperature of a suction valve connected to a refrigerating system which is to be desired for efficient operation. By means of the present invention, a clear-cut snap-action of the pilot valve is brought about by means of a pivot spring and lost-motion driving force which actuates a spring connected to the pilot valve, so that operation is had with a snap-action and instantaneous operation of the piston valve is thereby effected.

Accordingly, it is an object of this invention to provide a suction valve having a forceful, quick opening and closing action.

It is a further object of this invention to provide a valve having a snap-action operation which is effected by means of a lost-motion pivot spring which forcefully operates the valve with a positive and quick operating action.

Yet another object of this invention is to provide a valve in which the force acting to operate the valve may be increased by a mechanical advantage so that a more forceful action may be obtained.

A still further object of this invention is to provide a suction valve in which the force required to operate the valve may be adjusted in order that a critical force may be set which is needed before the valve can operate with a snap-action.

Another object of this invention is to provide a suction valve in which a certain critical force is required before operation of the valve can be effected, and in which modulation and throttling is eliminated by means of a lost-motion connection which operates only to actuate a spring connecting the valve when the desired valve actuating force is reached.

Still a further object of this invention is to provide a pilot-operated valve with a snap-action operation which may be adjusted to be responsive to a desired force, and which is compactly arranged for economy of construction with a minimum of materials and labor involved.

Further objects of the invention will be apparent from the accompanying drawings which illustrate a preferred embodiment of the invention which can be modified and still come within the teachings of the invention, as will be realized by those skilled in the art.

In the drawings:

Figure 1 is an axial cross section of the valve;

Figure 2 is an enlarged sectional view similar to Figure 1 showing the snap-action pivot mechanism; and Figure 3 is an enlarged sectional view similar to Figure 1 showing the lower portion of the snap-action mechanism and the pilot valve.

The invention comprises a valve housing or body 10, having an inlet 11 and an outlet 12 separated by a partition 13 provided with the customary valve port 14 surrounded by a valve seat 15. The valve body 10 has a cylindrical bore 16 above the port 14 coaxial therewith. The body 10 also has an upstanding upper portion 17, such upper body portion having an inner cylindrical surface coaxial with and larger than the bore 16. The inner surface 18 of the upper body joins the bore 16 at the circular ledge 19 which is between the two. The inner cylindrical surface of the upper body portion 17 is formed in two sections joined together by an internal ledge 20 upon which rests a flanged block 21.

The foregoing parts enclose a chamber for receiving a loose piston valve and a pilot valve arrangement. The piston valve member 27 is in the form of a piston cup, notched at its upper edge to prevent sealing off of gas from the pilot chamber defined by the inner cylindrical surface 18 and beneath the block 21. A stop ring 22 is set within the partition 13 so as to limit the upward movement of the piston. The piston valve member 27 is shaped to reciprocate within the bore 16, and has a tapered restricter plug 32 that aids in guiding valve seat disc 30 against the valve seat 15. The small bleed port 23 leads from the inlet 11 to the interior of the pilot chamber.

Depending from the block 21 is a pilot conduit 24 which communicates through a vertical drilled passageway 25 in the block, a radial passage 25a, and a peripheral groove around the block that registers with a lateral extension 26a of a drilled passageway 26 in the upper body 17, which last leads finally to the outlet 12. The lower end of the pilot conduit 24 constitutes the pilot valve seat 28, against which the pilot valve 29 is adapted to abut. The pilot valve member 29, as shown in Fig. 3, includes an insert 31 of bonded rubber or like material so as to provide proper sealing when closed against the valve seat 28. The pilot valve 29 is adapted to be moved into or out of contact with the seat 28 by reciprocation of the pilot valve operating rod 33 guided within the block 21 and connected to the valve 29 through snap-action mechanism indicated generally at 78, and which will be more fully described hereinafter.

The operating rod 33 is formed with an enlarged portion 34 which acts as a stop member to limit the downward movement of the rod upon contact with the block 21. The upper end of the rod 33 is secured into a buffer plate 45. A coil spring 46 surrounds the rod and enlarged portion 34 and, by engaging the block 21 and the buffer plate 45, urges the latter upwardly so as to hold the enlarged portion 34 a predetermined distance out of contact with the block 21.

A bellows 49 fits over the buffer plate 45 and associated parts. At its lower end, the bellows is sealed to a ring 50 that is permanently united to a bellows enclosure 51, bolted to body 10 by screws compressing gaskets on each end of part 21 which seals and holds the assembly mounted at 21 in the proper position. The bellows enclosure 51 is provided with a partition 52, that has an opening therethrough to establish free communication above and below it.

The upper part of the enclosure 51 receives an adjusting bellows construction. The adjusting bellows 54 is secured at its upper edge to a retainer ring 53 inserted into and attached to the enclosure 51. Above the ring 53 there is a plug 55 secured into the upper end of the enclosure 51, with a sleeve-like extension depending into the bellows 54. The plug 55 has a threaded bore that receives an adjusting screw 56 therethrough. The screw 56 is adapted to engage a buffer plate 57 within the bottom of the bellows 54, to limit the collapse of the bellows. The screw 56 projects above the plug 55 and receives a pointer 58 fitted thereover to rest against a locating ring 59. This pointer is adapted to engage the pin 60 pressed into the plug 55, which pin establishes the limits of rotation of a screw 56. A sealing cap 62 is threaded onto the enclosure 51 and is sealed with suitable gaskets. A temperature sensitive bulb 65 is connected by a capillary 66 into the enclosure 51. The bulb, capillary and enclosure between the bellows, known as the power element, are entirely filled with a solid charge of liquid having a low freezing point and a known coefficient of thermal expansion.

The snap-action mechanism 78 generally referred to above, comprises a leaf spring 70 fastened at its top by two rivets between support plates 71 and 72, the latter of which is anchored into the bottom of the block 21 so as to form a fixed base. The leaf spring 70 extends below the two support plates and is securely fastened to a backing plate 73 and a pivot plate 74, both of which terminate at the top so as to be spaced from the bottom of plates 71 and 72 to allow pivoting movement of the spring therebetween. The spring 70 has an offset lower portion beneath the backing strip 73 so as to be offset from the lower part of the pivot plate 74. This lower offset section of the spring 70 is fixed to the back of the valve element 29. The pivot plate 74 has one arm provided with an opening 75 which is slightly larger than the lower threaded portion 76 of the operating rod 33. Two crown-shaped nuts are loosely backed against the upper arm of the pivot plate 74 so that a sliding movement of the arm may be had therebetween to effect proper pivoting operation without binding when the operating rod 33 is reciprocated. The lower arm of the pivot plate 74 is bifurcated so as to fit over the rear stud-like portion 77 to which the spring 70 is attached, and it also abuts against the back of the valve member 29.

Operation

In the position shown in Fig. 1, the pilot valve 29 is closed and the pressures within the inlet 11 and the pilot chamber are equalized by virtue of fluid passing around the side of the piston valve 27 into the bore 16 and also through the bleeder port 23. Under this condition, and with a fluid pump connected to outlet 12, the pressure at inlet 11 will be higher than in the outlet 12 which communicates through pilot passages 26, 25 and 24 so as to permit the higher pressure in the pilot chamber to hold the valve 29 against the pilot valve seat 28. The piston valve 27 will be securely seated against the seat 15 due to the over-balance of pressure acting upon the top of the valve 27 as compared to the annular area at the bottom of the valve on the outside of the valve seat 15.

When the temperature at the bulb 65 increases, the liquid in the power element expands and causes the bellows 54 to collapse until its buffer plate 57 is against the screw 56, and then causes the collapse of the bellows 49 against the spring 46. This latter operation causes the downward movement of the rod 33.

When this occurs, the upper arm of the pivot plate 74 is moved downwardly in a pivoting action in a generally clockwise movement about the free section of the leaf spring 70 between the top of the backing plate 73 and the bottom of the plate 71. As this takes place, the movement of the bottom bifurcated section of pivot plate 74 is magnified due to the mechanical advantage accruing from the short horizontal leg of the upper portion of the pivot plate 74 and the long vertical leg in the lower section of this pivot plate, both of which act about the pivot point at the bottom of support plates 71 and 72. As is evident from an inspection of Fig. 3, the valve 29, which is held securely against the valve seat 28 by virtue of the pressure differential across this valve, will not be moved from its closed position immediately, since the offset portion of the leaf spring 70 is not designed to be strong enough to overcome this force. Therefore, the lower bifurcated section of the pivot plate 74 will, as the operating rod 33 is lowered, move into contact with the spring 70 until it abuts thereagainst. At this point, there is the combined force of the spring 70 which is building up force to move the valve 29 to the open position and the force of the pivot plate 74 tending to move in the clockwise direction about the free pivot point of the spring 70. This combined force eventually causes the valve 29 to move away from the valve seat 28 with a quick opening or snapping action.

Since the pilot passages 24, 25 and 26 are substantially larger than the bleed port 23 and the linkage area around the piston valve 27, the pressure within the pilot chamber is quickly reduced below that of the inlet pressure, so that the pressure on the bottom annular area surrounding the valve seat 15 is greater at the bottom of the piston valve 27 than the pressure at the top of the valve, causing the piston valve to move almost instantaneously upward when the pilot valve 29 is snapped away from the pilot valve seat. As the main valve 27 is opened, a passage is cleared through the port 14 and a pressure drop is effected on the fluid as it passes through the outlet 12, which insures that the pressure within the pilot chamber by communication with the pilot passages is of a lower value than that of the inlet pressure so as to force the piston valve all the way up and hold it in this position.

Should the temperature at the bulb 65 thereafter fall, the liquid in the power element will contract and the spring 46 will cause upward movement of the operating rod 33, to the position shown in Fig. 1, so as to close the valve 29 against the valve seat 28 with a quick closing or snapping action. The operation of the snap-action mechanism is the reverse of that previously described, since in the free position the lower bifurcated section of the pivot plate 74 is intermediately disposed between the spring 70 and the top of the valve 29 so that the same lost-motion effect is reestablished. Then as the snap-action mechanism 78 moves valve member 29 towards the seat member 28, as a result of the bulb 65 being cooled, valve member 29 reaches a position relative to pilot valve seat 28 so as to cause a restriction in the flow through passage 24, and the pressure in the pilot chamber will build up as a result of leakage through passage 23. Due to this increase in pressure in the pilot chamber, the force due to the pressure drop established across the pilot seat 28 will overcome the resisting force of the spring 70 and will cause a snapping and forceful closing of valve member 29 with respect to pilot seat member 28. When the pilot valve is closed, the pressure in the pilot chamber immediately builds up by the passage of fluid through the bleed port 23 and around the side of the piston valve 27, so that the pressure on the top of the piston valve overcomes the pressure on the annular area around the bottom and closes the piston valve against the valve seat 15 and stops fluid flow therethrough.

If the temperature of operation is to be changed, the cap 62 is removed and the screw 56 turned. If the screw is turned to expand the bellows 54, it decreases the volumetric liquid capacity of the thermal system, causing the bellows 49 to be collapsed and the pilot valve opened by a lesser amount of expansion of the thermal liquid, and hence at a lower temperature. Conversely, withdrawal of the screw increases the liquid capacity and elevates the temperature of operation. The gradient of the bellows 54 must be less than that of the operating bellows 49 or less than that of the operating bellows 49 plus gradient of spring 46. It is to be understood that the relative lengths of the upper and lower arms of the pivot plate 74 may be so designed as to magnify the movement of the lower arm by making these two arms of the desired ratio.

This valve is not designed to modulate or throttle, but rather to operate immediately to either open or shut positions. When used to regulate the flow of gas from an evaporator in a refrigerant system with the bulb responsive to temperature of the fluid being cooled, it will minimize short cycling of the compressor, and for air temperatures above freezing, will provide automatic defrosting of the evaporator.

Various modifications may be made of this invention, as will be readily apparent to those skilled in the art, and it is desired that the scope of the invention be limited only by the breadth of the appended claims.

What is claimed is:

1. A valve having a valve member adapted to be operated into contact and out of contact with a valve seat for control of fluid therethrough including means for actuating said valve member with an instantaneous snap action comprising a first valve operating member reciprocably movable between a first and second position, a second valve operating member pivotably connected to a stationary support, said second operating member having a first arm which is movable into and out of contact with the first valve operating member and adjustable means for controlling the contacting relationship therebetween, said second operating member being further provided with a second arm adapted to be moved in operating relation into and out of contact with the valve member rigidly connected to said first arm at the pivotable connection, and a resilient actuating element connected to the valve member and to said second valve operating member tending to open and close the valve responsive to movement of said first valve operating member when it reciprocates.

2. A valve having a valve member adapted to be operated into contact and out of contact with a valve seat for control of fluid therethrough including means for actuating said valve member with an instantaneous snap action comprising a first valve operating member reciprocably movable between a first and second position, a second valve operating member pivotably connected to a stationary support, said second operating member having a first arm which is movable into and out of contact with the first valve operating member and adjustable means for controlling the contacting relationship therebetween, said second operating member being further provided with a second arm adapted to be moved in operating relation into and out of contact with the valve member rigidly connected to said first arm at the pivotable connection, and a resilient actuating element connected to the valve member and to said second valve operating member tending to open and close the valve responsive to movement of said first valve operating member when it reciprocates, said resilient element being connected to the second arm of the valve operating member adjacent the pivotable connection at one end and said second arm having a free end positioned between the valve member and the other end of the resilient element adjacent its connection to the valve member.

3. A valve having a valve member adapted to be operated into contact and out of contact with a valve seat for control of fluid therethrough including means for actuating said valve member with an instantaneous snap action comprising a first valve operating member reciprocably movable between a first and second position, a second valve operating member pivotably connected to a stationary support, said second operating member having a first arm which is movable into and out of contact with the first valve operating member, said second operating member being further provided with a second arm adapted to be moved in operating relation into and out of contact with the valve member, said second arm being rigidly connected to said first arm at the pivotable connection and extending at an angle from and being substantially longer than the first arm, and a resilient actuating element connected to the valve member and to said second valve operating member tending to open and close the valve responsive to movement of said first valve operating member when it reciprocates.

References Cited in the file of this patent

UNITED STATES PATENTS

| | | |
|---|---|---|
| 1,000,720 | Curtis | Aug. 15, 1911 |
| 1,103,667 | Fulweiler | July 14, 1914 |
| 2,091,596 | Kluppel | Aug. 31, 1937 |
| 2,520,216 | Kounovsky | Aug. 29, 1950 |
| 2,584,419 | Branson | Feb. 5, 1952 |
| 2,664,246 | Ray | Dec. 29, 1953 |